(12) United States Patent
Kriesel et al.

(10) Patent No.: US 7,041,719 B2
(45) Date of Patent: ***May 9, 2006

(54) SHOCK ABSORBING COMPOUND

(75) Inventors: Matt Kriesel, Melrose, WI (US); Troy Goodenough, Mindoro, WI (US)

(73) Assignee: Impact Gel Holdings, Melrose, WI (US)

( * ) Notice: Subject to any disclaimer, the term of this patent is extended or adjusted under 35 U.S.C. 154(b) by 34 days.

This patent is subject to a terminal disclaimer.

(21) Appl. No.: 10/672,706

(22) Filed: Sep. 26, 2003

(65) Prior Publication Data

US 2004/0134669 A1   Jul. 15, 2004

Related U.S. Application Data

(63) Continuation-in-part of application No. 10/613,740, filed on Jul. 3, 2003, now Pat. No. 6,896,065, which is a continuation-in-part of application No. 10/094,030, filed on Mar. 7, 2002, now Pat. No. 6,588,511.

(51) Int. Cl.
    *C08K 5/1515* (2006.01)

(52) U.S. Cl. ..................................... 524/114

(58) Field of Classification Search ................ 524/114
    See application file for complete search history.

(56) References Cited

U.S. PATENT DOCUMENTS

| | | | | |
|---|---|---|---|---|
| 371,301 | A | 10/1887 | Burhans | 168/26 |
| 710,999 | A | 10/1902 | Powers | 168/26 |
| 757,473 | A | 4/1904 | Lemon | 168/26 |
| 3,049,515 | A | 8/1962 | Damnsis | 260/77.5 |
| 3,061,556 | A | 10/1962 | Gemeinhardt | 260/2.5 |
| 3,067,149 | A | 12/1962 | Dombrow et al. | 260/2.5 |
| 3,072,582 | A | 1/1963 | Frost | 260/2.5 |
| 3,747,684 | A | 7/1973 | Wallen | 168/26 |
| 3,905,925 | A | 9/1975 | Vervloet | 260/2.5 |
| 4,057,595 | A | 11/1977 | Rauner et al. | 260/824 |
| 4,342,122 | A | 8/1982 | Abraham et al. | 2/424 |
| 4,346,205 | A | 8/1982 | Hiles | 528/53 |
| 4,504,089 | A | 3/1985 | Calvert et al. | 297/214 |
| 4,513,825 | A | 4/1985 | Murphy | 168/12 |
| 4,631,758 | A | 12/1986 | Newman et al. | 2/424 |
| 4,756,949 | A | 7/1988 | Spence et al. | 428/159 |
| 4,761,843 | A | 8/1988 | Jay | 5/431 |
| 4,999,068 | A | 3/1991 | Chiarella | 156/78 |
| 5,112,061 | A | 5/1992 | Lamle | 273/411 |
| 5,252,373 | A | 10/1993 | Ganske et al. | 428/68 |
| 5,509,484 | A | 4/1996 | Landi et al. | 168/14 |
| 6,093,468 | A | 7/2000 | Toms et al. | 428/67 |
| 6,343,385 | B1 | 2/2002 | Katz | 2/411 |
| 6,497,057 | B1 | 12/2002 | Lee et al. | 36/35 |
| 6,896,065 | B1 * | 5/2005 | Kriesel et al. | 168/12 |
| 2001/0007180 | A1 | 7/2001 | Bordin et al. | 36/93 |

FOREIGN PATENT DOCUMENTS

| | | |
|---|---|---|
| JP | 2001112570 A2 | 4/2001 |
| WO | WO 94/24206 | 10/1994 |
| WO | WO 01/14313 A1 | 3/2001 |
| WO | WO 02/12749 A2 | 2/2002 |

* cited by examiner

*Primary Examiner*—Peter Szekely
(74) *Attorney, Agent, or Firm*—Steven L. Schmid

(57) ABSTRACT

Disclosed is an energy absorbing compound comprising an epoxidized vegetable oil, a thermoplastic polymer and a prepolymer. The energy absorbing compound is a polymeric compound which exhibits low rebound velocity and hysteresis. The energy absorbing compound possesses good energy-attenuating properties and is capable of absorbing repeat shocks without structural damage.

10 Claims, No Drawings

SHOCK ABSORBING COMPOUND

CROSS-REFERENCE TO RELATED APPLICATION

This application is a continuation-in-part of U.S. patent application Ser. No. 10/613,740, filed Jul. 3, 2003, now issued as U.S. Pat. No. 6,896,065, which is a continuation-in-part of U.S. patent application Ser. No. 10/094,030, filed Mar. 7, 2002, now issued as U.S. Pat. No. 6,588,511, the contents of which are hereby incorporated in their entirety.

FIELD OF THE INVENTION

This invention generally relates to polymeric compounds and in greater detail the invention relates to a viscoelastic, shock-attenuating elastomeric compounds and to their preparation.

BACKGROUND OF THE INVENTION

Polyurethanes and other types of elastomers and foams are used extensively in many kinds of safety padding, such as knee protectors for contact sports such as wrestling, protective knee, shoulder and arm pads for football and soccer players, ice hockey and basketball players, and the like. Conventional polyurethane foams and elastomers currently in use for these applications are intended to perform the functions of load distribution and energy attenuation or absorption. Experimental and practical evidence shows that although such foams and elastomers are good load distributors, they are frequently deficient in their shock and energy-attenuating capabilities. Ball rebound and pendulum impact test data for many of these foams and elastomers reveal that they possess fairly high rebound velocity due to their relatively low hysteresis. Moreover, they exhibit high-peak deceleration and severity index. Neither of these properties are conducive to their functioning as good energy attenuating polymeric substances.

In the field of footwear, insoles, outsoles, and other footwear components exhibiting energy-moderating or attenuating properties have been known for some time. Semi-flexible urethane foams have been used extensively in automotive interior safety padding such as crash pads, sun visors, arm rests, door panels, steering wheel panels, and the like. Stiffer semi-flexible foams and elastomers have been used in exterior safety applications in particular, as shock-attenuating bumpers.

However, most of the products utilized by the automotive and footwear manufacturers exhibit relatively low hysteresis which is detrimental to good energy-attenuation. Other approaches have taken the form of a combination of a polyurethane exterior deformable front-pad backed by a relatively complicated hydraulic shock absorption system as, for example, represented by the new automotive bumpers. Such approaches are not desirable from an economic point of view.

Attempts have been made to modify polyurethane foams and elastomers to obtain materials which possess more efficient energy-attenuating properties. For example, semi-flexible shock absorbing polyurethane foams prepared from a polyether triol, a compound having a single reactive hydrogen, an aromatic polyisocyanate, blowing agent, chain extender and a catalyst have been made. While these materials exhibit good shock-absorbing properties, the single reactive hydrogen reactant which is a naphthol, naphthola-mine or a hydroabietyl alcohol imparts the undesirable characteristic odor of these aromatic compounds to the resulting foam. Accordingly, this approach to shock-absorbing polyurethanes is not particularly desirable.

Additionally, tire filling compounds have been formed from polyether polyols having equivalent weights from 900 to 1800, and polyisocyanates at isocyanate indexes of 0.8 to 2.0. The resulting polyurethanes exhibit very high rebound resiliency and are not suitable as energy-moderating polymers.

Thus, what is needed is polymeric compound having both viscoelastic and shock-attenuation properties.

SUMMARY OF THE INVENTION

The present invention generally relates to an energy absorbing material such as a polymeric compound which exhibits low rebound velocity and high hysteresis, among other desirable characteristics which are conducive to the function of a good energy-attenuating material. The polymeric compound is capable of repeatedly absorbing shock without structural damage and without appreciable sag due to prolonged exposure to continuous dynamic loading. Additionally, the polymeric compound provides vibration damp-ening, sound attenuation, and various energy absorbing functions.

Generally the energy absorbing compound comprises an epoxidized vegetable oil, a thermoplastic polymer and a prepolymer. The epoxidized vegetable oil generally encompasses either an epoxidized soybean or linseed oil or combinations of the two. The epoxidized vegetable oil typically comprises more than 50% by weight of the energy absorbing compound. Furthermore, the energy absorbing compound may also include an activator such as a metal catalyst.

In an additional embodiment, the energy absorbing compound may comprise the epoxidized vegetable oil and a thermoplastic polymer which is substantially free of a polyurethane. The energy absorbing compound also includes a prepolymer and the metal activator. Typically, the metal activator is an alkyl tin compound and the prepolymer comprises an isocyanate.

In greater detail, the energy absorbing compound comprises on a percent weight basis of compound at least greater than 50% of a vegetable based plasticizer. The vegetable based plasticizer includes epoxidized vegetable oils, such as linseed and soybean oils. Additionally, the energy absorbing compound includes between about 20% to about 40% of a thermoplastic polymer and between about 5% to about 20% of a prepolymer. The shock absorbing compound may include between about 0.1 to about 5% of an activator.

In a further embodiment, the present invention includes a method of forming the energy absorbing compound. The method of forming the energy absorbing compound includes combining and mixing an epoxidized vegetable oil and a thermoplastic polymer which is substantially free of a polyurethane and a prepolymer to form the energy absorbing compound, which is allowed to cure or set into a gel like state.

In an additional embodiment, the method for forming the energy absorbing compound includes forming the compound using a two part polymer. The first part of the polymer mix includes an epoxidized vegetable oil and a prepolymer and the second component comprises a thermoplastic polymer, an epoxidized vegetable oil and an activator. The activator typically includes an alkyl tin compound and the vegetable oil is selected from soybean oil, linseed oil, and a combinations thereof.

DETAILED DESCRIPTION

The present invention comprises both an energy absorbing compound and a method for making the same. The energy absorbing compound typically comprises an epoxidized vegetable oil combined with a prepolymer and a thermoplastic polymer. Additionally, a catalyst or an accelerant may be added to the energy absorbing compound to aid in the formation of the compound. Typically the activator or accelerant is a metal activator such as an alkyl tin compound.

The compound may be described as a gel or having gel-like qualities. The use of the term "gel" is not intended to be restrictive as to describing only a colloidal system but is used to describe any semi-solid substance that is both resilient and elastic.

The elastomeric compound includes an epoxidized vegetable oil which can function as a plasticizer. By way of example, but not limited example, epoxidized vegetable oils include epoxidized soybean oil, epoxidized linseed oil and epoxidized tall oil. Additional examples of epoxidized vegetable oils include epoxidized corn oil, epoxidized cottonseed oil, epoxidized perilla oil and epoxidized safflower oil. Epoxidized vegetable oils are typically obtained by the epoxidation of triglycerides of unsaturated fatty acid and are made by epoxidizing the reactive olefin groups of the naturally occurring triglyceride oils. Typically, the olefin groups are epoxidized using a peracid. One example of an acceptable epoxidized vegetable oil is an epoxidized soybean oil, Paraplex G-62, available from C. P. Hall Company of Chicago, Ill. Paraplex G-62 can function as both a plasticizer and a processing aid and is a high molecular weight epoxidized soybean oil on a carrier having an auxiliary stabilizer for a vinyl group.

In one embodiment, the gel composition comprises on weight percent basis an amount greater than 50% of the epoxidized vegetable (all percentages herein are by weight based on the total weight of the blended compound or gel). Additionally, the epoxidized vegetable oil may be included in an amount between about 55% to about 70%. In a further embodiment, the epoxidized vegetable oil may be included in an amount between about 55% and about 65% or include in an amount of about 60%.

The elastomeric composition includes a prepolymer. Various prepolymers may be utilized in the present composition so long as they do not substantially hinder the desired viscoelastic, shock-attenuating attributes of the elastomeric compound. Typically, the prepolymer is an isocyanate. The isocyanates that are suitable for the reactions of the present invention include aliphatic, cycloaliphatic, araliphatic, aromatic and heterocyclic polyisocyanates. While not intended to be limiting, specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane; 2,4- and 2,6-hexahydro-tolylene diisocyanate and mixtures of these isomers, perhydro-2,4'- and/or 4,4'-diphenylmethane diisocyanate, 1,3- and 1,4-phenylene diisocyanate, 2,4- and 2,6-tolylene diisocyanate and mixtures of these isomers, diphenylmethane-2,4'- and/or 4,4'-diisocyanate, naphthyl-ene-1,5-diisocyanate, triphenylmethane-4,4',4"-triiso-cyanate, polyphenylpolymethylene polyisocyanates of the type obtained by condensing aniline with formaldehyde, followed by phosgenation.

Example isocyanates include prepolymers based on methylene diphenylisocyanate reacted with polyoxyethylene/ polyoxypropylene diols of 1000 and 2000 MW to be acceptable. These materials are known by such tradenames as Isonate 2181® from Dow, Mondur MP210® from Bayer, Rubinate 1209® and Rubinate 1790® from HuntsmanIsonate.

In one embodiment, the isocyanate may comprise on weight percent basis in the gel composition an amount between about 5% and about 20%. Additionally, the isocyanate may be included in an amount between about 5% to about 15%. In a further embodiment the isocyanate may be included in an amount between about 7% and about 11% or in an amount of about 9%.

The thermoplastic component of the present elastomeric compound can be comprised of most any thermoplastic compound having elastomeric properties. In one embodiment of the gel composition, thermoplastic compounds comprising polyurethane are excluded since such compounds tend to generally have the effect of limiting the elastomeric properties to the gel composition.

In one embodiment, an acceptable thermoplastic component includes polydienes. An example polydiene includes polybutadiene. Typically, the polybutadiene is a low molecular weight hydroxyl terminated polybutadiene resin such as Poly bd® available from Sartomer of Exton, Pa. Such resins or thermoplastics have primary allylic alcohol groups that exhibit high reactivity in condensation polymerization reactions.

The thermoplastic may comprise on weight percent basis in the gel composition an amount between about 20% and about 40%. Additionally, the thermoplastic may be included in an amount between about 25% to about 35%. In a further embodiment the isocyanate may be included in an amount between about 26% and about 33% or in an amount of about 29%.

Catalysts which are useful in producing the elastomeric composition in accordance with this invention include: (a) tertiary amines such as bis(dimethylaminoethyl) ether, trimethylamine, triethylamine, N-methylmorpholine, N-ethylmorpholine, N,N-dimethylbenzylamine, N,N-dimethylethanolamine, N,N,N', N'-tetramethyl-1,3-butanediamine, triethanolamine, 1,4-diazabicyclo [2.2.-2]octane, N,N-dimethylcyclohexylamine, N-methyldicyclohexylamine, 1,8-diazabicyclo [5,4,0]-undecene-7 and its salts such as phenol salt, hexanoate, and oleate; 2,4,6-tris (diaminomethyl) phenol, and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoracetylacetone, ethyl acetoacetate, salicylaldehyde, cyclopentanone-2-carboxylate, acetylacetoneimine, bis-acetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as MoO++, UO++, and the like; (f) alcoholates and phenolates of various metals such as Ti(OR), Sn(OR), Al(OR), and the like, wherein R is alkyl or aryl and the reaction products of alcoholates with carboxylic acides, beta-diketones, and 2-(N,N-dialkylamino) alkanols, such as the well known chelates of titanium; (g) salts of organic acids with a variety of metals such as alkali metals, alkaline earth meals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivates of tetravalent tin, trivalent and pentavalent As, Sb, and Bi and metal carbonyls of iron and cobalt, mercury compounds such as arylmercury carboxylates, phenylmercury acetate and propionate, and the like.

Typically, the activator or catalyst is an alkyl tin compound such as dialkyltin salts of carboxylic acids, e.g., dibutyltin diacetate, dibutyltin dilaurate, dibutyltin maleate, dilauryltin diacetate, dioctyltin diacetate, dibutyl-tin-bis(4-methylaminobenzoate), dibutyltin-bis(6-methylaminocaproate), and the like. Dialkyltin mercaptides, in particular diakyltin dimercaptide carboxylic acid esters, can also be utilized. Similarly, there can be used a trialkyltin hydroxide, dialkyltin oxide, dialkyltin dialkoxide or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis-(2-dimethylaminopentylate), dibutyltin dichloride, dioctylin dichloride, and the like.

A specific example of an alkyl tin compound is a dioctyltin carboxylate, Cotin 430, available from Cambrex Co. of Itasca, Ill. Cotin 430 is a liquid organotin catalyst that is less sensitive to moisture and initiates relatively slower than other organotin catalysts.

The catalyst is employed in small amounts, for example, from about 0.001 percent to about 5 percent or more, based on weight of the reaction mixture gel. In a further embodiment the catalyst may be added in amount between about 0.1% to about 2%. An additional embodiment includes the catalyst added in an amount or less than 1% or in an amount of about 0.3%.

It is within the scope of the present invention to incorporate other additives such as fillers, pigments, surfactants, plasticizers, organic blowing agents, as stabilizers, and the like, in the manufacture of the energy-attinuating viscoelastic elastomers, gels and foams of this invention.

In addition to water, a chemically participating extender and carbon dioxide-producing blowing agent, foams can be prepared by the use of conventional organic blowing agents. Typical representative examples are trichlorofluromethane, methylene chloride, low boiling hydrocarbons, ethers and ketones, and the like. The use of water in combination with one or more organic blowing agent is also contemplated.

Particularly in the manufacture of foams, surface-active additives such as emulsifiers and foam stabilizers can be used. Suitable emulsifiers include, for example, the sodium salts of castor oil sulfonates and salts of fatty acids with amines such as oleic acid diethylamine and stearic acid diethanol amine. Alkali or ammonium salts of sulfonic acids, such as dodecyl benzene sulfonic acid, or dinaphthylmethane disulfonic acids can be used. The alkali or ammonium salts of fatty acids, such as ricinoleic acid, or of polymeric fatty acids can also be used as surface-active additives.

Suitable foam stabilizers include polyether siloxanes, particularly water-soluble block copolymers of siloxanes and polyethers. These compounds generally are prepared by joining a copolymer of ethylene oxide and propylene oxide or a homopolymer of ethylene oxide to a polydimethylsiloxane radical.

Suitable stabilizers against the effects of aging and weathering and substances having fungistatic and bacteriostatic effect can also be used. Typical additives of this type are phenolic and aromatic amine antioxidants, UV-stabilizers, hindered carbodiimides known to retard hydrolysis and oxidation, arsenic fungicidal compounds, tin and mercury bacteriocides, and the like.

Fillers which can be used for the purpose of extension or reinforcement of the elastomers and foams of the present invention include, among others, amorphous silicone hydroxides, carbon black, walnut and pecan shells, cork, cellulose, starch, calcium carbide, zinc oxide, titanium dioxide, clays, calcium wallastonite, and the like.

The method of forming the elastomeric compound includes combining the previously described components and letting such a mixture set to form the gel compound. The components once combined may then be stirred or mixed together such they can combine to form the gel. In an additional embodiment, the method includes a two part mix which can be combined to form the gel compound. The first part of the mix includes the plasticizer and the prepolymer. The second part also includes the plasticizer along with the thermoplastic polymer and the catalyst. The two parts are then combined and mixed to form a gel mix that is allowed to set to form the semi-solid gel composition.

It will be understood by those skilled in the art that while the present invention has been discussed above with respect to various preferred embodiments and/or features thereof, numerous changes, modification, additions and deletions can be made thereto without departing from the spirit and scope of the invention as set forth in the following claims.

What is claimed is:

1. An energy absorbing compound comprising:
   at least greater than 50% by weight of an epoxidized vegetable oil;
   a hydroxy functional thermoplastic elastomer; and
   a prepolymer containing an isocyanate or isocyanate monomer.

2. The energy absorbing compound of claim 1, further including an activator.

3. The energy absorbing compound of claim 2, wherein the activator is an alkyl tin compound.

4. The energy absorbing compound of claim 1, wherein the epoxidized vegetable oil is selected from the group consisting of soybean oil, linseed oil, and combinations thereof.

5. The energy absorbing compound of claim 1, wherein the thermoplastic elastomer comprises a polydiene.

6. The energy absorbing compound of claim 5, wherein the polymer is a polybutadiene.

7. An energy absorbing compound comprising of a percent weight basis of the compound:
   at least greater than 50% of a vegetable based plasticizer;
   between 20% and 40% of a hydroxy functional thermoplastic elastomer; and
   between 5% and 20% of an isocyanate containing a prepolymer or isocyanate monomer.

8. The energy absorbing compound of claim 1, further including between 0.1% to 5% of an activator.

9. The energy absorbing compound of claim 8, wherein the activator is an alkyl tin compound.

10. The energy absorbing compound of claim 7, wherein the vegetable based plasticizer is selected from the group consisting of soybean oil, linseed oil, combinations thereof and is in an amount of between 55% to 70%.

* * * * *